United States Patent [11] 3,602,574

[72] Inventor Eric L. Courtens
 Adliswil-Zurich, Switzerland
[21] Appl. No. 824,434
[22] Filed May 14, 1969
[45] Patented Aug. 31, 1971
[73] Assignee International Business Machines
 Corporation
 Armonk, N.Y.
[32] Priority May 22, 1968
[33] Switzerland
[31] 07633/68

[54] LIGHT MODULATION BY RESONANT FARADAY EFFECT
 19 Claims, 6 Drawing Figs.
[52] U.S. Cl. .................................................. 350/151,
 331/95.4, 350/150, 350/160 R
[51] Int. Cl. ...................................................... G02f 1/22
[50] Field of Search ............................................. 350/150,
 151, 160; 331/94.5 G, 94.5 Q; 333/95

[56] References Cited
 UNITED STATES PATENTS
3,270,291 8/1966 Kosonocky .................. 331/94.5
3,277,396 10/1966 Statz et al. .................... 331/94.5 X
3,281,713 10/1966 Soules .......................... 331/94.5
3,328,583 6/1967 Davison ....................... 350/150 X
3,393,954 7/1968 Enderby et al. ............... 350/150

OTHER REFERENCES

Bloembergen et al., Physical Review Vol. 120, No. 6 (Dec. 15, 1960) pp. 2014– 2023 350/151
Chen, " An Absorption-Type Laser Modulator" from Lasers and Applications; W. S. C. Chang Ed (Ohio State University, Columbus—1963) pp. 202– 207
George et al., Applied Optics Vol. 4, No. 2 (Feb. 1965) pp. 253– 254 350/151
McCall et al., Physical Review Letters Vol. 18, No. 21 (22 May 1967) pp. 908– 911
Patel et al., Physical Review Letters Vol. 19, No. 18 (30 Oct. 1967) pp. 1019– 1022
Karlov, JETP Letters Vol. 7, No. 5 (5 Mar. 1968) pp. 134– 136.

Primary Examiner—David Schonberg
Assistant Examiner—Paul R. Miller
Attorneys—Hanifin and Jancin and Joe L. Koerber ABSTRACT: Giant Faraday rotations, of linearly polarized light pulses, are obtained in an optically resonant medium when the medium operates under the conditions of self-induced transparency. The giant rotations permit utilization of relatively weak modulating magnetic fields of high frequency. Because of the velocity reduction of the light pulses in the resonant medium in a pulse code modulation arrangement, the medium is placed in a slow wave structure to provide synchronization between the modulating magnetic field signal and the light pulses.

INVENTOR
ERIC L. COURTENS

BY Joe L. Koehler
ATTORNEY

LIGHT MODULATION BY RESONANT FARADAY EFFECT

BACKGROUND OF THE INVENTION

This invention is related to a method and apparatus for the modulation of light using the Faraday effect.

The Faraday effect is known to be the effect of rotating magnetically the plane of polarization of linearly polarized light by applying an axial magnetic field thereto, i.e. a magnetic field acting in the propagation direction of the light. To build up the switching field normally one has to apply magnetic fields of considerable strength to create a perceptible effect. Therefore light modulators designed according to the Faraday principle generally require a considerable amount of power for control. If, on the other hand, on tries to take advantage of the supporting effects of properties of the materials used (e.g. increase the inner field of the light modulator by employing ferromagnetic material) the response time is considerably increased. Thus, it becomes too slow for a useful application in information transmission systems of high channel capacity.

It is an object of this invention to provide an improved method and apparatus for the modulation of light.

It is a further object of this invention to provide a method and apparatus for the modulation of light using the Faraday effect, which is rapid in response and which allows utilization of controlling magnetic fields which are weaker than those heretofore required.

It is yet a further object of this invention to provide an improved method and apparatus for the modulation of light which method and apparatus provides giant Faraday rotations under the conditions of self-induced transparency, thereby permitting utilization of weaker magnetic fields of higher frequency than those heretofore employed.

It is still further an object of this invention to provide a device which produces a high Faraday rotational effect with a minimum of absorption loss.

In accordance with the present invention the modulation of light, using the Faraday effect, is provided, wherein, for the purpose of rotating the plane of polarization of linearly polarized light, an axial magnetic field acts on coherent light pulses in an optically resonant medium under conditions of self-induced transparency.

The foregoing and other objects, features and advantages of the invention will be apparent from the following more particular description of a preferred embodiment of the invention, as illustrated in the accompanying drawings.

The quantum electronic effect of "self-induced transparency" is a nonlinear optical propagation effect whereby a normally opaque medium becomes transparent to coherent light pulses with an electrical field strength above a threshold value. The light pulses are absorbed and continuously reemitted by the system being excited, at its optical resonant frequency, and the intensity and shape of the pulses reemitted remain essentially unchanged. In this manner the medium becomes transparent to the laser light, the latter penetrating the medium without any appreciable attenuation. This effect has been reported in the literature by, among others, S. L. McCall and E. L. Hahn in a paper entitled "Self-induced Transparency by Pulsed Coherent Light," *Physical Review Letters*, Vol. 18, No. 21 of May 22, 1967, pages 908–911. C. K. N. Patel and R. E. Slusher have also described the effect in their paper "Self-induced Transparency in Gases," *Physical Review Letters*, Vol. 19, No. 18 of Oct. 30, 1967, pages 1019–1022.

Reference is made in the literature to the so-called $2\pi$-pulses, which pulses are explained in terms of the Feynman vector model that relates to the Schrodinger's equation. In this model the pseudodipole moment vector runs through a complete circle when a two-level system is excited from its ground state to the upper level and then back to its ground state. (*Journal of Applied Physics*, Vol. 28, No. 1, Jan. 1957, pages 49–52)

One of the known properties of these $2\pi$-pulses lies in the fact that, within the resonant medium their propagation velocity, i.e., their signal velocity, is strongly decreased under the conditions of self-induced transparency. However, heretofore it was not known that under conditions of self-induced transparency, $2\pi$-pulses exhibit a strong Faraday effect which effect allows for achieving a large Faraday rotation of the polarized light with relatively weak axial magnetic fields providing relatively undiminished optical output pulses.

Figure 1:
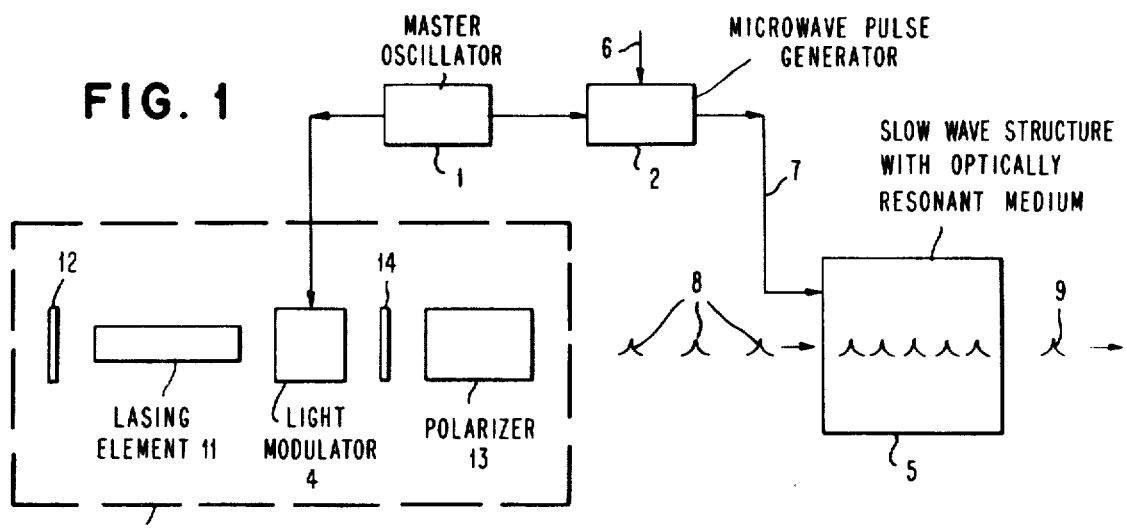
FIG. 1 is a schematic diagram of an embodiment of the modulation method and apparatus in accordance with the principles of the present invention whereby linearly polarized laser pulses are converted into coded optical pulses by modulating microwave signals.

With reference to FIG. 1, there is shown schematically a diagram of an embodiment of the modulation arrangement in accordance with the present invention. As shown in FIG. 1, the axial magnetic field in slow wave structure 5, which acts to modulate the light pulses from laser 11, is produced in response to synchronized microwave signals of same propagation velocity received from microwave pulse generator 2. The master oscillator 1 effects the synchronization, in time and space, of the propagation velocities of the microwave signals generated by the microwave pulse generator 2 with the coherent and polarized light pulses generated by the optical transmitter system 3. The optical transmitter system 3 may be any of a variety of known transmitters that produce polarized light of an optical frequency which corresponds to the resonant frequency of the medium used for self-induced transparency. For example, such a transmitter may comprise any of a variety of solid state lasers or gas lasers of suitable intensity. Alternatively a so-called giant pulse laser may be used. Likewise a parametric light oscillator or any other suitable source which will produce appropriate radiation pulses may be employed.

In the optical transmitter system 3 of FIG. 1, a light modulator 4 of common design serves to control the repetition rate of the generated light pulses in accordance with the frequency of a master oscillator 1. Since this light modulator 4 is driven by a simple sinusoidal signal, the problems encountered in the high-speed transmission of random signals, such as information signals, do not exist here. Accordingly, as well-known Pockels cell may be employed as the light modulator. Using the Pockels cell modulation control by periodical signals up to high microwave frequencies can be effected through resonant circuits of high quality Q with relatively low power. However, employing circuits of this kind is not a preferred form of modulation for randomly varying modulating signals, such as those coded with information to be transmitted.

In the embodiment shown in FIG. 1, the optical transmitter 3 employs a solid state laser comprising solid state element 11 and mirrors 12 and 14. Polarizer 13, is shown in FIG. 1, may be any of a variety of known polarizing means. Alternatively, a laser with Brewster windows may be employed to provide linearly polarized coherent light pulses.

As shown in FIG. 1, block 5 represents a slow wave structure having included therein the resonant material upon which the light pulses impinge to effect self-induced transparency. The slow wave structure or delay device of block 5, which may be any of a variety of microwave delay devices, such as, for example, a helix slow wave structure, acts as a delay line to microwave signals such that the phase velocity of the latter is made equal to the propagation velocity of the light pulses. This slowing down or delaying of the microwave signals is necessitated by the face that, as heretofore mentioned, light pulses within the resonant medium decrease in their propagation velocity under the conditions of self-induced transparency. Accordingly, slow wave structure 5 effects synchronization between the microwave signals and the light pulses in the resonant medium contained within the structure.

The description of the operation of the modulation arrangement of FIG. 1 will be made more clear from the following example of its use in a PCM information transmission system. As shown in FIG. 1 the information carrying signals are fed to signal input line 6. In response thereto microwave pulse generator 2 acts to provide on its output line 7 digital microwave signals in synchronism with the light pulses generated by the optical transmitter 3. These microwave signals are applied to the slow wave structure or delay device 5 to modulate the light pulses generated by optical transmitter 3 as these latter signals are received by the resonant medium in slow wave structure 5. The phase-locked light pulses from optical transmitter 3 are shown at 8 where they are about to impinge upon the resonant medium in delay device 5 from whence they will be delayed by the optically resonant medium due to resonant absorption and reemission. This delay is depicted at 5 by the row of pulses with shorter distances therebetween than those shown at 8. The axial component of the magnetic field of the microwave pulses traveling together with the light pulses controls the polarization of the light pulses by rotation of their plane of polarization according to the code of the modulating signals received from microwave pulse generator output line 7. Accordingly, the output signals shown at 9 are optical pulses coded with respect to the direction of their polarization plane.

Because the optically resonant medium within delay device 5 operates under the conditions of self-induced transparency the absorption loss therein is minimal, even at resonance. Thus, the output pulses at 9 are relatively undiminished and, because of the high rotational effect obtained at resonance, bear information as a result of a small modulating magnetic field.

It is clear, to use these output pulses there may be provided any of a variety of output devices. For example, an analyzer may be provided at the output of slow wave structure 5 in such a way that the linearly polarized light being not modulated is extinguished. Hence, every light pulse which is modulated by a microwave signal causes a brightening by rotation of its plane of polarization and will be passed through the analyzer.

For better understanding of the invention and the conditions of self-induced transparency, there will now be described a simplified theory of self-induced transparency as it relates to some properties of $2\pi$-pulses. First to be described will be the proof of the strong delay of the light pulses in an optically resonant medium, as it is shown in a similar manner by the first paper cited above. Second to be described will be the proof of a giant Faraday effect under the condition of self-induced transparency, a result heretofore unknown. This strong Faraday effect at optical resonance whereby under the conditions of self-induced transparency the light pulses experience a negligible attenuation, is the basis of the novel method and apparatus for the modulation of light in accordance with the principles of the present invention.

The propagation of $2\pi$-pulses, i.e., the absorption and reemission of linearly polarized light in an atomic two-level system of an optical resonant medium, results in a decrease of the signal velocity. This result can simply be derived from energy considerations. The energy flow per unit cross-sectional area can be computed in two ways. The first way to compute this energy flow is to integrate the energy density over the length of the pluses, at one instant of time. Part of the energy density is to be found in the electromagnetic wave and part in the excitation of the resonant centers of the medium. Let $U_{em}$ denote that part due to the electromagnetic field and $U_c$ denote that part due to the excited two-level system. Since the spatial extend of the $2\pi$-pulse is $V\tau$, the energy content per unit area is $$E = V\tau(U_{em} + U_c) \qquad (1)$$

The second way to compute this energy flow is to integrate in time the energy flowing through a unit cross section. Since the flow is all in the electromagnetic wave, and takes place with the phase velocity of said wave, a second expression for the energy content per unit area is given by:

$$E = (c/n)\tau U_{em} \qquad (2)$$

here $c$ represents the velocity of light in vacuum and $n$ designates the refractive index of the medium without consideration of the resonant centers, i.e. the refractive index of the host. Equating (1) and (2) one obtains:

$$V = \frac{cU_{em}}{n(U_{em} + U_c)} \text{ or } \frac{1}{V} = \frac{n}{c} + \frac{nU_c}{cU_{em}} \qquad (3)$$

The exact averages to be used for $U_c$ and $U_{em}$ can only be calculated from the exact pulse shape. However, from the results of McCall and Hahn in the first cited paper, it turns out, that the time dependences of $\epsilon^2$ and of the population inversion in the excited system are identical. Therefore the ratio $U_{em}/U_c$ can be calculated from the peak values of $U_{em}$ and $U_c$.

One has for the circularly polarized wave in case of resonance $$(U_{em})_{peak} = \frac{n^2}{4\pi} \epsilon^2_{max} = \frac{n^2}{\pi\tau^2\kappa^2} \qquad (4)$$

where $\kappa$ is a value indicating the strength of interaction between the electromagnetic wave of the light and of the excited two-level system. Also, $\kappa = 2p/\hbar$, and $\hbar = h/2\pi$. $p$ represents the $x$- or $y$-component of the macroscopic electrical dipole moment of the excited transition and $h = 2\pi\hbar$ represents Planck's constant.

In case of exact resonance one has $$(U_c)_{peak} = N\hbar\omega \qquad (5)$$

where $N$ is the number of excitation centers and $\omega$ the angular frequency of the light $\omega = 2\pi\nu$.

By inserting the peak values of $U_{em}$ and $U_c$ into equation (3) one obtains the reciprocal energy velocity of the light in case of exact resonance:

$$\frac{1}{V} = \frac{n}{c} + \frac{\pi N\hbar\omega\tau^2\kappa^2}{nc} \qquad (6)$$

This is the same result as obtained by McCall and Hahn for the case of resonance.

Figure 3:
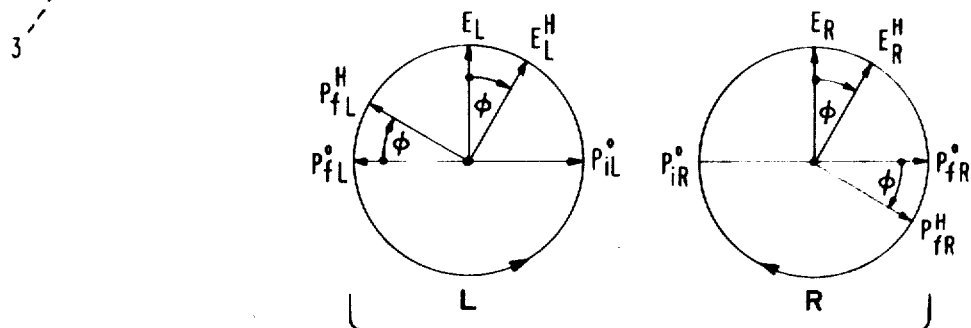
FIG. 3 shows the vectors of the left and right circularly polarized components of the light in their rotating frames, as pertains to FIG. 2, and their relation to the polarization of the excited system.

In the following there will be shown, with the aid of FIGS. 2 and 3, that apart from the known reduction of the propagation velocity of the light in case of resonance, there is also to be expected a giant Faraday effect when an axial magnetic field H is present.

Figure 2:
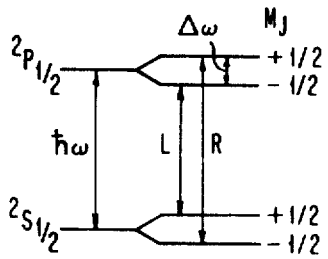
FIG. 2 shows the energy level scheme of, for example, an excited alkali vapor with states split by a magnetic field and the possible radiant transitions.

To estimate the strength of that rotation of the plane of polarization, let us consider a simple two-level scheme of the energy states of a microsystem as depicted in FIG. 2. Such an energy level diagram is, for example, typical for a stimulated atomic alkali vapor with transitions from the ground state $^2S_{1/2}$ to the first excited state $^2P_{1/2}$.

Both states as shown in FIG. 2 are separated by a difference in energy $\hbar\omega$ where $\omega$ is the angular frequency of light and $\hbar = h/2\pi$ is Planck's constant divided by $2\pi$. The application of an axial magnetic field H separates the levels into doublets with a difference in frequency $\Delta\omega$. The corresponding magnetic quantum numbers $M_J$ are indicated in FIG. 2. The expression "frequency" as used here represents the angular frequency. A linearly polarized light pulse, centered at frequency $\omega$, can be decomposed into its left and right polarized components, corresponding to the transitions of the level diagram indicated with L and R, respectively. In FIG. 3 both components of the light are shown as vectors in their respective rotating frames. The direction of rotation is indicated by an arrow designated with L and R, respectively, in the lower part of the circles.

In the absence of a magnetic field the behavior of a $2\pi$-pulse can best be described with reference to FIG. 3. In the absorption region, i.e. at the leading edge of the $2\pi$-pulse, the macroscopic dipole $P^o{}_{iL}$ or $P^o{}_{iR}$ is 90° behind the field, i.e. $E_L$ or $E_R$. At the maximum of the $2\pi$-pulse, i.e. at complete population inversion of the upper level, the dipole moment becomes zero. In the emission region, i.e. the trailing edge of the $2\pi$-pulse, the macroscopic dipole $P^o{}_{fL}$ or $P^o{}_{fR}$, is 90° ahead of the field. The upper index $o$ associated with P indicates the absence of a magnetic field. The lower index $i$ indicates the beginning and $f$ the end of the $2\pi$-pulse.

However, these conditions change with the application of an axial magnetic field in z-direction, the propagation direction of the light. As shown in FIG. 3 the upper index H is applicable now. Now dipole $P_R$ rotates slightly faster than the electric field $E_R$ of the right circular polarized component of the light pulse, and $P_L$ rotates slightly slower than $E_L$ of the left circular polarized component. The difference corresponds to the difference in angular frequency $\pm\Delta\omega$ of the magnetic level splitting in FIG. 2 and results in $P_f{}^H$ being rotated away from $P_f{}^o$ by an angle $\Phi = \Delta\omega\tau$, where $\tau$ is the pulse duration measured approximately at half maximum. Since the polarization $P_f{}^H$ can be regarded as source of the electrical field, a rotation of the plane of polarization of the corresponding electrical field takes place. The E-vectors of the emitted field of the $2\pi$-pulse are also rotated by the same angle $\Phi$.

It is important to note, that these emitted fields are not those at cross section $z$, but are the fields which prevail somewhere further in the material, at a cross section $z+\Delta z$. To estimate this length $\Delta z$ assume that the electromagnetic energy crossing the unit area at $z$ is all absorbed and reemitted by the material over the length $\Delta z$. Using the definitions given above, this can be written as $$(c/n)U_{em}\tau = zU_c \qquad (7)$$

The Zeeman splitting of the energy-levels due to the applied magnetic field amounts to $\Delta\omega = g\beta H/\hbar$, where $g$ is the g-factor and $\beta$ represents the Bohr magneton.

The specific Faraday rotation $\theta$ in radians per unit length and unit magnetic field is calculated in the following way $$\theta = \frac{\phi}{\Delta z H} = \frac{n\Delta\omega U_c}{cHU_{em}} = \frac{n}{c}\frac{g\beta}{\hbar}\frac{U_c}{U_{em}} \qquad (8)$$

It can be seen from this equation that, as in the case of the decrease in signal velocity, the Faraday rotation is proportional to the ratio $U_c/U_{em}$. Comparing equation (8) with the equation (3) derived above, it can be seen that large Faraday rotation and large velocity reduction are both related to large values of the ratio $U_c/U_{em}$.

In the case of magnetic level splittings $\Delta\omega$, meeting the condition $\Delta\omega\tau \ll 1$, the peak values of $U_{em}$ and $U_c$ according to equations (4) and (5) can be taken so that finally the specific Faraday rotation results in $$\theta = Ng\beta\omega\pi\kappa^2\tau^2/nc \qquad (9)$$

It can be seen from equation (9) that rotation of the plane of polarization does not only depend on the physical parameters of the system, but also on the square of the pulse duration. For typical systems, the effect is very large, even for short pulses.

This extraordinarily strong Faraday rotational effect at optical resonance provides a highly improved arrangement for the modulation of light, as shown for example, in the arrangement of FIG. 1. The delay provided by slow wave structure 5 shown therein may be provided by any of a variety of known arrangements. Thus, for example, in a helical-type structure, the group and phase velocities of the microwave pulses can be made equal and much lower than the velocity of light in vacuum. This phase velocity can then be made to match the propagation velocity of the light pulses. As the two waves travel together, the light polarization is rotated. The proper mode for such a helical structure is the lowest order H-mode. As another example, it is noted that a slow wave structure or delay device may be constructed of a set of near resonant cavities coupled together.

Figure 4A:
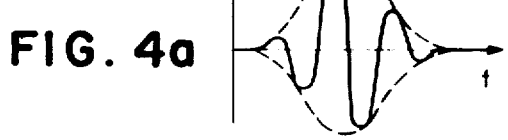
FIG. 4a and 4b shows qualitatively the duration of a light pulse compared with a modulating microwave signal in a helical slow wave structure.
Figure 4B:
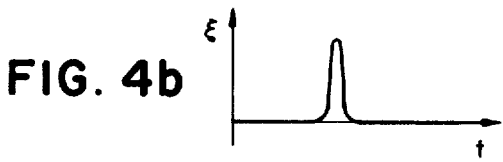

If, for example, in FIG. 1 a delay device 5 were a helical-type delay line surrounding a core of optical resonant material, one could direct light pulses axially onto that core and feed the microwave signal to the helix. Matching would have to be such that both electromagnetic waves are traveling together in the delay device. FIG. 4a shows the $H_z$ component of a microwave pulse as a function of time. The pulse shape is formed by the dotted drawn envelope, comprising a few periods of the carrier frequency. FIG. 4b shows a light pulse, i.e. the envelope of an optical pulse. The figure compares qualitatively the duration of a light pulse with that of the modulating microwave signal. In view of the fact that within the delay device 5 the phase velocity of the microwave equals the propagation velocity of light in the resonant medium, one can also read the time-coordinate $t$ as length $z$. It is clear that within the delay device 5 the markedly shorter light pulse is traveling in the region of maximum amplitude of the axial magnetic field of the modulating microwave pulse.

It is to be noted with respect to the modulation arrangement of FIG. 1 that since the generation of linearly polarized and coherent light pulses is phase locked with the modulating microwave signals via the master oscillator 1, the arrival times of both types of pulses can effectively be brought to coincidence at delay device 5. The microwave pulses cause, when present, an axial magnetic field within the microwave delay device, which delay device includes or is filled with the optically resonant material. When traveling together through the delay device, the axial magnetic field acts on the optical pulse in the resonant medium and rotates its plane of polarization.

Several conditions with regard to the line width must be fulfilled for the modulator arrangement of FIG. 1 to function in accordance with the principle of the present invention. The optical line width $\Gamma$ is composed of two parts. The first part is the contribution $\Gamma'$ of the so-called homogeneous line broadening and the second part is the contribution $\Gamma^*$ of the so-called inhomogeneous line broadening. In both cases the line width $\Gamma'$ or $\Gamma^*$ is measured in angular frequency as half width of the light pulse at half intensity. The reciprocal $T_2 = 1/\Gamma$ is called the relaxation time, which is composed, in a similar manner, of two parts $T_2'$ and $T_2^*$. The relaxation time $T_2'$ of homogeneous line broadening of the resonant transition must be greater than $\tau$, the pulse duration. This relationship is necessary for the light modulator of FIG. 1 to operate under the conditions of self-induced transparency to provide giant Faraday rotation in accordance with the novel aspects of the present invention.

There are many possible combinations of light and material which may be used in the modulation arrangement described in FIG. 1. For example, one may use gases as an optically resonant system. With gases the relaxation time is relatively long, usually of the order of the spontaneous emission time and as such allows use of very strong transitions and work at elevated temperatures. An example of coincidence useable for self-induced transparency with gases is the system used in the second cited paper consisting of a $CO_2$ laser and a sulpher-fluoride ($SF_6$) absorber. The output frequency of the laser coincides with an absorption frequency of the $SF_6$ gas.

As hereinabove stated, in accordance with the novel concepts of the present invention, the homogeneous relaxation time $T_2'$ of the absorbing material used must be longer than the duration of the optical pulses of the transmitter. Accordingly, solid state materials to be stimulated to self-induced transparency by a mode-locked giant pulse laser of common design must normally be cooled for the purpose, since that the homogeneous relaxation time of the solid state material increases with decreasing temperature. Thus, since optical pulses of a duration in the order of $10^{10}$ through $10^{18}$ sec. are produced by the Q-switching of a giant pulse laser, in the ruby laser—ruby absorber system described below, the ruby crystal in the microwave delay device must be cooled to helium temperature. However, if the optical transmitter consists of a special mode-locked Q-switched laser, then pulse durations in the order of $10^{13}$ sec. can be realized. Since many solid state materials show transverse relaxation times longer than $10^{-12}$ sec., systems are possible which can be operated at elevated temperatures, or even at room temperature.

The increasing number of discoveries of so-called coincidences between laser lines and atomic or molecular excitable transitions provide additional possibilities to be used in self-induced transparency, and hence in the modulation arrangement of FIG. 1, described in accordance with the principles of the present invention. These possibilities multiply with the application of laser structures tunable over a wider spectral range or with the application of parametric conversion for the generation of coherent light. Thus the light of the optical transmitter 3 in FIG. 1 can be tuned and matched to the requirements of the absorber material in delay device 5.

Figure 5:
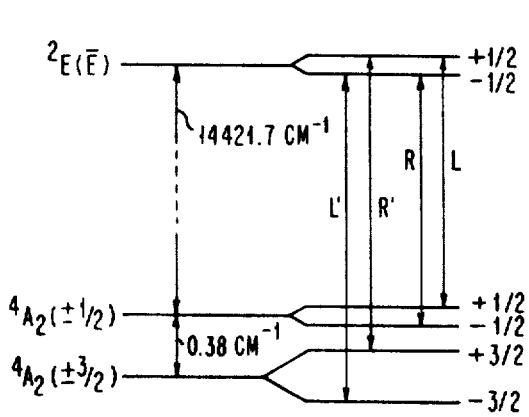
FIG. 5 is the energy level scheme of an excited solid state system as, for example, a ruby laser—ruby resonant crystal.

With reference to FIG. 5, there is shown the energy level diagram for the explanation of a special ruby laser—ruby crystal system, whereby the laser operates at nitrogen temperature and the ruby crystal at helium temperature. In such an arrangement the pulse width of the ruby laser is less than the relaxation time of the ruby crystal and the output frequency of a ruby laser at nitrogen temperature due to the transition $$^4A_2\,(\pm 3/2) \leftrightarrow {^2E}(\bar{E})$$

coincides with an absorption frequency of the ruby crystal at helium temperature due to the transition $$^4A_2(\pm 1/2) \leftrightarrow {^2E}(\bar{E}).$$

The Zeeman level splitting, as shown in FIG. 5, is effected by an axial magnetic field acting in the propagation direction of the light as described with respect to FIG. 1. By L' and R' or L and R, there is designated allowed transitions associated with the emission of left or right circularly polarized light, respectively. Faraday rotation in this system can be described in the following way. A linearly polarized optical pulse propagating in z-direction has an electrical field vector $\vec{E}$ in x-direction and impinges upon the optical resonant medium at z=0. The pulse may be decomposed into its right and left circularly polarized components.

$$\vec{E}(z,t) = \epsilon(z,t)\{[\vec{x}\cos(\omega t - kz + \psi) - \vec{y}\sin(\omega t - kz + \psi)]$$
$$+ [\vec{x}\cos(\omega t - kz - \psi) + \vec{y}\sin(\omega t - kz - \psi)]\}$$
$$= 2\epsilon(z,t)\cos(\omega t - kz)(\vec{x}\cos\psi - \vec{y}\sin\psi) \quad (10)$$

The unit vectors of the coordinate directions are designated $\vec{x}$ and $\vec{y}$ and $\omega$ represents the center frequency, i.e. the center angular frequency of light. The wave number $K=n\omega/c$ corresponds to the light propagation vector when no resonant centers are present. At the incidence of the wave the quantity $\psi=0$. When propagating inside the Faraday active medium $\psi$ increases proportionally with the length coordinate and designates the angle of Faraday rotation.

As heretofore mentioned, when defining the quantity $\kappa$, $p$ designates the x- or y-component of the macroscopic electric dipole moment of the resonant transition. Self-induced transparency can be achieved when the envelope of the optical pulse is given by the following hyperbolic secant function. (Hyperbolic secant is the reciprocal of hyperbolic cosine.)

$$\epsilon(z,t) = \frac{\hbar}{p\tau}\operatorname{sech}\left[\frac{1}{\tau}\left(t - \frac{z}{V}\right)\right] \quad (11)$$

The reciprocal signal velocity can be expressed in the following way:

$$\frac{1}{V} = \frac{n}{c} + \frac{4\pi p^2 N_{\text{eff}}\tau^2}{n\hbar c}\int_{-\infty}^{+\infty}\frac{g(\bar{w})d\bar{w}}{1+(\bar{w}+w)^2\tau^2} \quad (12)$$

The integrated energy of the light pulse per unit cross section area is taken as $$E = (nc\hbar^2/\pi p^2 \tau) \quad (13)$$

where $\tau$ is the parameter determining the duration of the optical pulse. As given above V is the propagation velocity of the light pulse in the resonant medium, $N_{\text{eff}}$ is the effective density of the resonant centers, $g(\bar{w})$ is the normalized distribution function accounting for the inhomogeneous line broadening produced by the resonant centers, $\bar{w}$ is the angular frequency increment of the light measured from center frequency $w$ and $w$ is the angular frequency proportional to the effective axial magnetic field H, which corresponds to half of the Zeeman level-splitting of the stimulated transition.

In the system represented by FIG. 5, there exists coincidence between the energies of the transition $^2E(\bar{E}) \leftrightarrow {^4A_2}(\pm 3/2)$ of the ruby laser at $N_2$ temperature with that of the transition $^2E(\bar{E}) \leftrightarrow {^4A_2}(\pm 1/2)$ of the ruby crystal at He temperature. The line width of the transition at nitrogen temperature is determined by inhomogeneous line broadening and amounts to about 0.1 cm.$^{-1}$. Such a line width allows for mode-locked operation of the ruby laser with a pulse duration $\tau$ in the order of 100 psec. ($10^{-10}$ sec.).

Hence, the following values can be given for the ruby laser—ruby crystal system represented by FIG. 5. The spectrum of the light pulse can be centered at about 14,421.7 cm.$^{-1}$. In view of the small line width of the ruby laser the transitions from $^4A_2(\pm 3/2)$ level to the $^2E(E)$ levels in the ruby crystal are negligible with respect to the Faraday effect. Their frequency is too far from the considered transition $^4A_2(\pm 1/2) \leftrightarrow {^2E}(\bar{E})$. The effective density of resonant centers may be assumed equal to the population difference between one of the lower levels and the upper level. Since in the unexcited state of the ruby the $^2E(\bar{E})$ levels are not populated, one can assume equal density for the population of the four ground levels at 4.2° K. The value for the effective density of resonant centers can then be assumed as a quarter of the density of the $Cr^{3+}$ ions in the ruby crystal.

The Faraday rotation of the plane of polarization can be calculated from the energy differences between the transitions causing the circularly polarized components of the light pulse. The g-factors amount to $g_{11}(^2E)=2.445$ and $g_{11}(^4A_2)=1.984$. Hence, the angular frequency as a function of the magnetic field can be determined as $$w = \tfrac{1}{2}[g_{11}(^2E) - g_{11}(^4A_2)](\beta H1\hbar) = 0.23(\beta H/\hbar) \quad (14)$$

The angle of Faraday rotation is given by $$\psi = \phi Hz = z\,\frac{4\pi p^2 \omega N_{\text{eff}}\tau^2 \omega}{n\hbar c}\int\frac{g(\bar{w})d\bar{w}}{1+(w+\bar{w})^2\tau^2} \quad (15)$$

For example, the ruby crystal at helium temperature may have a $Cr^{3+}$ ion concentration of about 0.1 percent. With the low temperature of 4.2° K. it is assured that the homogeneous relaxation time $T_2'$ is much larger than the pulse duration $\tau$. The parameters, then, take the following values:

$\tau = 10^{-10}$ sec.
$N_{\text{eff}} \cong 10^{19}$ cm.$^{-3}$
$p^2 \cong 5 \times 10^{-41}$ erg cm.$^3$
$n = 1.76$
$\omega = 2.72 \times 10^{15}$ sec.$^{-1}$ In the case of weak magnetic fields, i.e. small values of $w$, the integral of equations (12) and (15) becomes practically independent of $w$ and takes the 1/2 value for the magnitudes of line width and pulse duration $\tau$ hereinabove discussed. From these parameter values there can be calculated a pulse energy of about 3.7 millijoules/mm.$^2$ for the cross-sectional area and a propagation velocity of $3.3 \times 10^8$ cm./sec. With respect to the length $z$ the specific Faraday rotation will be calculated as $\theta = \Phi zH = 0.35$ Degrees/Gauss cm.

A modulator using ruby in this manner could be made, as hereinabove discussed, using a helical slow wave structure. A small 0° ruby rod, of a few millimeters diameter, would adequately serve as a core for the helix which should have a wire length to helix length ratio of about 30. This ratio, together with the microwave dielectric constant of ruby (9.5 for the TE-wave), will provide the required total delay or slowing down of the microwave pulses by a factor of 90.

The microwave power required in the lowest order H-mode, for the purpose of achieving an axial magnetic field of 1 gauss, can be kept less than 1 watt by keeping the diameter of the ruby small, for example smaller than approximately 2 mm. The optical beam is focused into the ruby. The length of the ruby rod may be from 1 to a few centimeters, depending upon the amount of rotation required and upon the defraction losses in the beam.

By employing a carrier frequency of the order of 2 GHz a PCM system, such as shown in FIG. 1, would have an effective bandwidth of several 100 MHz. Using a microwave power of approximately 10 watts in a proper helix mode and a ruby 2 cm. long and 1.5 mm. diameter, a rotation of the order of 5° to 10° may be provided. In such an arrangement a significant portion of the incident light power would emerge from an analyzer placed after the Faraday rotator, and such portion of light could then be employed to convey information.

Although the use of ruby has been discussed in some detail in demonstrating the novel principles of the modulation arrangement in accordance with the present invention, it should be recognized, from some standpoints, ruby may not be preferred. For example, ruby has an effective g-value of 0.23 while there are other materials which would be expected to have a g-value of 2 or more. Larger g-values would proportionately reduce the required magnetic field strength and thereby allow reduction in the required microwave power. Likewise, the modulating power can be decreased by the application of a material exhibiting a stronger transition since the Faraday rotation increases with the magnitude of the so-called transition matrix element.

Accordingly, it should be recognized that materials having larger g-factors and stronger transition matrix elements may, from some standpoints, be preferred. It is clear that different combinations of materials for laser and absorber may be employed. It is likewise clear that the shorter the light pulses, the higher the repetition rate and the more effective the bandwidth in an information transmission system.

While the invention has been particularly shown and described with reference to a preferred embodiment thereof, it will be understood by those skilled in the art that various changes in form and details may be made therein without departing from the spirit and scope of the invention.

What is claimed is:

1. A light modulator comprising:
    an optically resonant medium;
    means for applying polarized high intensity coherent light pulses to said resonant medium so as to effect self-induced transparency in said medium; and
    means for applying a modulating magnetic field to said resonant medium to rotate the plane of polarization of said polarized light pulses in accordance with said field.

2. The light modulator as set forth in claim 1 wherein said means for applying a modulating magnetic field is phase-locked with said light pulses.

3. The light modulator as set forth in claim 1 wherein said means for applying polarized light pulses includes a laser means.

4. The light modulator as set forth in claim 1 wherein said means for applying a modulating magnetic field includes a slow wave structure.

5. The light modulator as set forth in claim 1 wherein said means for applying a modulating magnetic field includes microwave pulse generator means.

6. The light modulator as set forth in claim 5 including means to synchronize said microwave pulse generator with said means for applying polarized light pulses.

7. The light modulator as set forth in claim 6 wherein said means for applying a magnetic field includes a helix slow wave structure surrounding said optically resonant medium for receiving said microwave pulses.

8. The light modulator as set forth in claim 7 wherein said means for applying polarized light includes a laser device.

9. A light modulator employing the Faraday rotational effect comprising:
    an optically resonant medium;
    means for applying polarized coherent light pulses to said resonant medium having a duration less than the relaxation time of said resonant medium and effective to cause self-induced transparency in said optically resonant medium; and
    means for applying a modulating magnetic field to said resonant medium to rotate the plane of polarization of said polarized coherent light pulses in accordance with said field to obtain resonant Faraday rotation without attenuation of said pulses.

10. The modulator as set forth in claim 9 wherein said optically resonant medium is ruby.

11. The modulator as set forth in claim 11 wherein said means for applying polarized light pulses includes a mode-locked ruby laser at liquid nitrogen temperature and said ruby resonant medium is at liquid helium temperature.

12. A light modulator employing the Faraday rotational effect comprising;
    an optically resonant ruby medium at liquid helium temperature;
    means for applying polarized light pulses to said resonant medium having a duration less than the relaxation time of said resonant medium and effective to cause self-induced transparency in said optically resonant medium, said means for applying polarized light pulses including a mode-locked ruby laser at liquid nitrogen temperature and a light modulator for modulating the light pulses from said mode-lock ruby laser; and
    means for applying a modulating magnetic field to said resonant medium to rotate the plane of polarization of said polarized light pulses in accordance with said field to obtain resonant Faraday rotation without attenuation of said pulses.

13. The modulator as set forth in claim 12 wherein master oscillator means phase locks the field pattern of said means for applying a modulating magnetic field with said light modulator.

14. The modulator as set forth in claim 13 wherein said means for applying a modulating magnetic field includes a microwave pulse generator.

15. The modulator as set forth in claim 14 wherein said means for applying a modulating magnetic field further includes wave guide structure means surrounding said ruby resonant medium operated near its cutoff frequency.

16. The modulator as set forth in claim 15 wherein said wave guide structure means is a helix means acting to slow said microwave pulses so that the energy propagation velocity of latter matches the energy velocity of said light pulses.

17. A light modulator comprising:
    a slow wave structure containing an optically resonant medium;
    polarized light pulse means for applying plane polarized coherent light pulses to said optically resonant medium at the optical resonance of said medium and sufficient to effect self-induced transparency in said medium so that said light pulses are reemitted from said resonant medium delayed in time and unattenuated; and
    microwave pulse generator means for applying modulating microwave pulses to said slow wave structure in synchronism with said light pulses to rotate the plane of polarization of said light pulses in accordance with said modulating microwave pulses.

18. The modulator as set forth in claim 17 wherein said polarized light pulse means includes a $CO_2$ laser and said optically resonant medium comprises sulpher-fluoride.

19. A method of modulating light to provide a high Faraday rotational effect without absorption loss comprising:
    applying polarized high intensity coherent light pulses to an optically resonant medium to cause self-induced transparency so that said polarized light pulses incident upon said resonant medium are continuously absorbed and reemitted; and
    applying an axial magnetic field to said optically resonant medium to rotate the plane of polarization of said polarized light pulses in accordance with said magnetic field whereby large rotational effect is provided with a small applied field.